United States Patent [19]

Peters et al.

[11] 4,390,449

[45] Jun. 28, 1983

[54] METHOD OF PREPARING STOICHIOMETRIC ZINC SILICATE PHOSPHOR WITH IMPROVED BRIGHTNESS AND PERSISTENCE

[75] Inventors: Thomas E. Peters, Chelmsford; James R. McColl, Concord, both of Mass.

[73] Assignee: GTE Laboratories Incorporated, Waltham, Mass.

[21] Appl. No.: 357,013

[22] Filed: Mar. 11, 1981

[51] Int. Cl.³ ............................................. C09K 11/44
[52] U.S. Cl. ............................................. 252/301.6 F
[58] Field of Search ................................. 252/301.6 F

[56] References Cited

U.S. PATENT DOCUMENTS

| | | |
|---|---|---|
| 2,176,099 | 10/1939 | Pfanstiehl . |
| 2,238,026 | 4/1941 | Moore . |
| 2,247,192 | 6/1941 | Fonda . |
| 2,252,500 | 8/1941 | Fonda . |
| 2,537,262 | 1/1951 | Ellefson . |
| 2,554,999 | 5/1951 | Merrill . |
| 3,416,019 | 12/1968 | Kaduk ........................ 252/301.6 F |
| 3,586,635 | 6/1971 | Vanik et al. . |
| 4,231,892 | 11/1980 | Chang et al. . |

FOREIGN PATENT DOCUMENTS 536305 5/1941 United Kingdom ......... 252/301.6 F

OTHER PUBLICATIONS

Gashurov et al., "J. Electrochem. Soc.: Solid State Science", 114, pp. 378-381, (1967).
Von K.-Th. Wilke, "Zeitschrift fur Physikalische Chemie", vol. 224, pp. 51-56, (1963).
Froelich et al., "J. Phys. Chem.", 46, pp. 878-885, (1942).

*Primary Examiner*—Jack Cooper
*Attorney, Agent, or Firm*—Jerry F. Janssen

[57] ABSTRACT

Manganese-arsenic coactivated zinc silicate phosphors comprising a host of substantially stoichiometric zinc silicate and characterized by enhanced brightness and persistence are prepared by a method which includes a two-step firing schedule. The initial pre-fired phosphor powder blend is formulated with an amount of silicic acid less than or equal to the amount stoichiometrically required for the formation of zinc silicate. Any excess zinc oxide remaining in the mixture following the first firing step is removed by addition of ammonium chloride and a second firing step. The resulting phosphors are substantially free of inert zinc oxide and silica which would otherwise contribute to diminished brightness and persistence.

5 Claims, 3 Drawing Figures

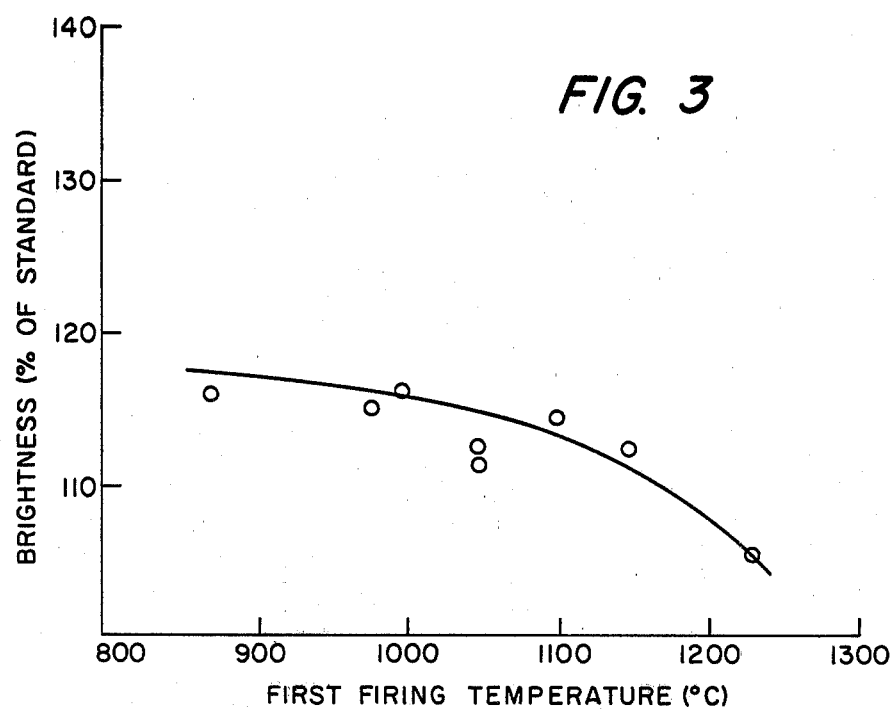

METHOD OF PREPARING STOICHIOMETRIC ZINC SILICATE PHOSPHOR WITH IMPROVED BRIGHTNESS AND PERSISTENCE

BACKGROUND OF THE INVENTION

This invention relates to luminescent materials and methods of making luminescent materials. More particularly, it is concerned with a method of making a substantially stoichiometric zinc silicate phosphor having improved brightness and persistence.

Manganese activated zinc silicate is a well known green emitting cathodoluminescent phosphor identified commercially as type P-1. When manganese is incorporated into zinc silicate, the resulting material is often off-white or dark in appearance. A white-bodied manganese activated zinc silicate phosphor can be produced by employing excess silica over the amount stoichiometrically required during the formulation of these phosphors as taught by U.S. Pat. No. 2,245,414 to Roberts, or by incorporating small amounts of magnesium ion into the zinc orthosilicate lattice as disclosed in U.S. Pat. No. 3,416,019 to Kaduk.

The P-1 phosphors, however, are generally characterized by rapid fluoroescence decay and can exhibit the undesirable visual effect of flicker when used in such applications as cathode ray tubes operated at low refresh rates. To improve the persistence of manganese activated zinc silicate phosphors, small amounts of arsenic are added as taught by U.S. Pat. No. 2,554,999 to Merrill et al. Arsenic-containing manganese activated zinc silicate phosphors are identified commercially as type P-39.

While persistence in type P-39 phosphors generally increases with increasing arsenic content, it does so at the expense of brightness. Often, small changes in arsenic concentration will produce large changes in phosphor brightness. Thus, in producing these phosphors, an attempt is made to carefully control the arsenic concentration to effect a trade-off between enhanced persistence on the one hand and diminished brightness on the other.

However, a rigorous control of the arsenic concentration is often difficult, owing to the tendency of arsenic compounds to volatilize from the phosphor formulation during the repeated high temperature firings often required for the formation of zinc silicate. To facilitate the formation of zinc silicate, it has been the practice to employ alkali metal or alkaline earth metal salts as fluxes during firing as taught by U.S. Pat. No. 2,247,192 to Fonda. The indiscriminate use of such fluxes is not desirable, however, since fluxes such as lithium chloride can completely quench the effect of extended fluorescence conferred upon P-39 phosphors by the incorporation of arsenic [see for example, Froelich and Fonda in *J. Phys. Chem.*, 46:878–885 (1942)].

In U.S. Pat. No. 4,315,190 to Peters et al., assigned to the assignee of the present invention, there are described type P-39 zinc silicate phosphors modified by the addition of small amounts of alkali metal salts to enhance brightness and persistence.

SUMMARY OF THE INVENTION

In accordance with the present invention, there is provided a method of preparing green emitting phosphors comprising a host of substantially stoichiometric zinc silicate coactivated with manganese and arsenic. The phosphors are characterized by improved brightness and persistence over prior art type P-39 phosphors prepared by methods which employ excess silica during formulation.

The method comprises a first step of forming a blend of zinc oxide, silicic acid, and oxide of arsenic, and a salt of manganese thermally convertible to manganese oxide at the firing temperatures employed. Optionally, magnesium fluoride may be added to the blend in small amounts. Silicic acid is added to the initial phosphor blend in an amount less than or equal to the molar amount stoichiometrically required to react with the amount of zinc oxide present in the blend.

The blend is next subjected to a first firing at a temperature and for a period of time sufficient to produce a pre-fired material including zinc silicate.

Ammonium chloride is added to the pre-fired material in an amount in excess of that required to completely react with any excess zinc oxide remaining in the pre-fired material subsequent to the first firing step.

The pre-fired material containing ammonium chloride is then subjected to a second firing step at a temperature and for a period of time sufficient to remove any excess zinc oxide remaining in the pre-fired material and to form a green emitting phosphor comprising substantially stoichiometric zinc silicate.

BRIEF DESCRIPTION OF THE DRAWING

In the drawing:

FIG. 3 is a graph illustrating the relationship between the brightness of phosphors made in accordance with the method of this invention and the first firing temperature.

Figure 1:
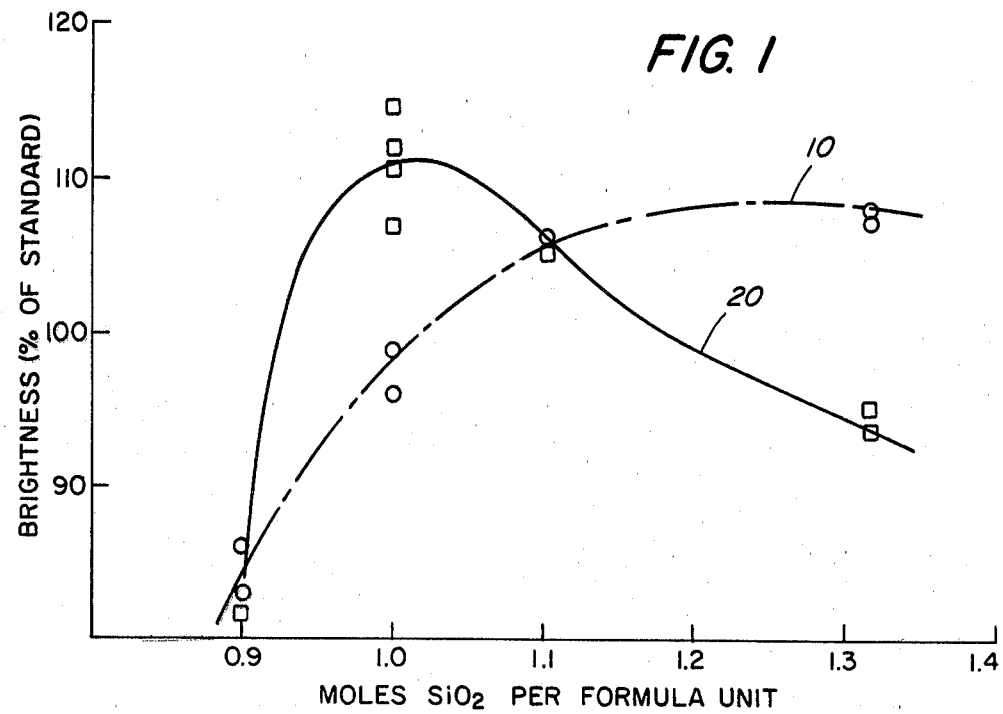
FIG. 1 is a graph illustrating the relationship between brightness of phosphors made in accordance with the method of this invention and the amount of silica contained in the phosphor formulations.

For a better understanding of the present invention together with other and further objects, advantages and capabilities thereof, reference is made to the following disclosure and appended claims in connection with the above described drawing figures.

DESCRIPTION OF THE PREFERRED EMBODIMENTS

Manganese-arsenic coactivated zinc silicate phosphors have generally been made heretofore by methods which call for the initial pre-fired phosphor blend to contain excess silica in order to produce a white-bodied phosphor after firing. The brownish body color or dark spots which can occur in such phosphors when they contain excess zinc oxide is thought to be due to the presence of unreacted, partially reduced zinc oxide. This conjecture is supported by x-ray diffraction analysis of such materials which shows the phases of both ZnO and $Zn_2SiO_4$ to be present. Excess $SiO_2$ in the initial phosphor blend facilitates complete reaction to the ZnO, resulting in a white-bodied phosphor after firing.

Excess inert materials such as ZnO or $SiO_2$ contained in the final phosphor can contribute to brightness losses since they absorb electrons but do not contribute to the overall light output of the phosphor. Excess zinc oxide can further contribute to brightness losses because it can also darken the body color of the phosphor.

Prior art methods of producing P-1 or P-39 phosphors introduce excess silica in the initial phosphor blend to remove excess zinc oxide, but as a result often introduce excess silica into the final phosphor. While brightness is expected to be diminished by the presence of excess silica in the phosphor, it is somewhat surprising to find that persistence is also adversely affected by the presence of silica. Persistence in zinc silicate phosphors should be independent of silica concentration; however, it has been found that persistence is a function of the initial silica concentration in a manner not fully understood at this time.

The present invention provides a method for preparing a white-bodied, green emitting substantially stoichiometric zinc silicate phosphor characterized by enhanced brightness and persistence. The method results in phosphors having a zinc silicate host substantially free of inert zinc oxide and silica components which can detract from brightness and persistence.

In the first step of the method, a finely divided powder blend is prepared of zinc oxide, silicic acid, an oxide of arsenic, and a manganese compound thermally convertible to manganese oxide at the firing temperatures employed. The acetate, carbonate, or nitrate of manganese may be used, with the carbonate being preferred. The preferred ranges of concentration of each component of the initial phosphor powder blend are given in Table I.

TABLE I

| Component | Moles/Formula Unit of Phosphor |
|---|---|
| Zinc oxide | 2.0 |
| Silicic acid | 0.9–1.0 |
| Magnesium fluoride | 0–0.04 |
| Manganese salt | 0.001–0.01 |
| Arsenic oxide | 0.00005–0.001 |

Silicic acid is added to the initial powder blend in an amount less than or equal to the molar amount stoichiometrically required to form $Zn_2SiO_4$ with the amount of zinc oxide provided, preferably in an amount greater than 0.9 times the molar amount required.

Either the trioxide or the pentoxide of arsenic may be employed. No perceptible difference in final phosphor brightness or persistence was noted between samples fired with the two forms of arsenic oxide.

Small amounts of magnesium fluoride, preferably up to about 0.04 moles per formula unit of phosphor are added as a flux to the initial powder blend to facilitate the otherwise sluggish formation of zinc silicate.

All components are mixed as dry powders with the exception of arsenic oxide which is mixed with the dry powder mixture by the aqueous slurry method. Following the addition of the arsenic oxide, the mixture is dried and the resulting cake pulverized.

The mixture of powders is then subjected to a first firing in air at a temperature of between about 650° C. and 1200° C. A lower temperature is preferred for the first firing step since it is postulated that a lower temperature prevents loss of arsenic oxide by volatilization. Referring to FIG. 3 it can be seen that the brightness of the final phosphor decreases with an increase in the temperature of this first firing step. The temperature of the first firing step is preferably maintained below about 1000° C., preferably in the range of about 850° C. to about 1000° C.

The primary function of the first firing step is to "fix" the arsenic in the pre-fired material, possibly in the form of zinc arsenate. The formation of zinc arsenate appears to occur rapidly, with no significant growth in zinc silicate particle size at the low temperature employed in this first firing step. Since no change in the persistence of the final phosphor was noted with variation of first firing time between a lower limit of one hour and an upper limit of about four hours, the time of firing in this first firing step does not appear to be critical.

Following the first firing step, the pre-fired material is mixed with ammonium chloride in an amount sufficient to react with any unreacted zinc oxide which remains in the pre-fired material. Since any excess ammonium chloride is volatilized from the mixture during the second firing step, it is preferred that ammonium chloride be added to the pre-fired mixture in relatively large amounts, preferably up to about 10 weight percent of the pre-fired mixture.

Following addition to ammonium chloride to the pre-fired phosphor material, the resulting mixture is subjected to a second firing step at a temperature higher than that employed in the first firing step, preferably in the range of about 1000° C. to about 1300° C. This second firing step facilitates conversion of remaining unreacted zinc oxide to zinc chloride which volatilizes from the mixture at the temperatures employed in the second firing step. The second firing step is carried out for a period preferably from one to four hours.

Two sets of samples were prepared in which the concentration of silicic acid in the initial powder blend was varied between about 0.9 moles of silicic acid per formula unit of phosphor up to about 1.32 moles of silicic acid per formula unit of phosphor. In one set of samples, ammonium chloride was added in about 5 weight percent to the pre-fired material following the first firing step. In the second set of samples, the ammonium chloride addition was omitted between firing steps. The brightness and persistence of each sample was measured and compared to a standard commercial sample of P-39 phosphor. Brightness and persistence were measured by methods detailed in U.S. Pat. No. 4,315,190 to Peters et al. The results of these measurements appear in FIGS. 1 and 2.

In FIG. 1 the brightness of samples prepared by the method of this invention, which entails a two-step firing schedule with the addition of ammonium chloride to the mixture between firings, appears as the solid curve 20. The brightness of phosphors prepared by the same steps, but omitting the addition of ammonium chloride between firing steps appears as the dashed curve 10.

Figure 2:
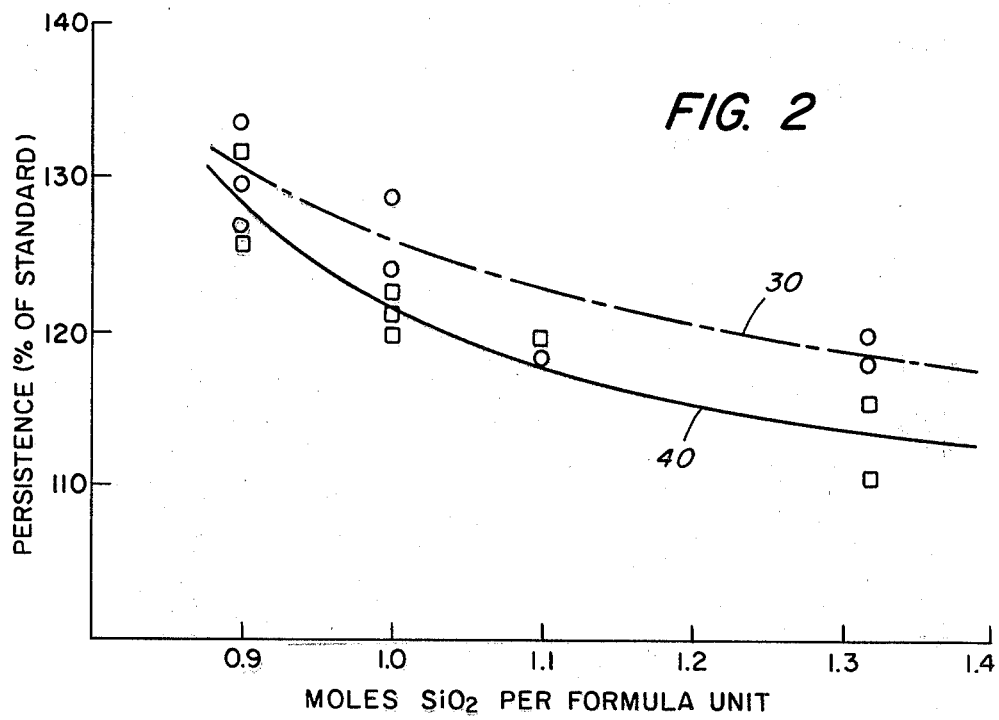
FIG. 2 is a graph illustrating the relationship between fluorescence persistence of phosphors made in accordance with the method of this invention and the amount of silica contained in the phosphor formulation.

In FIG. 2 the presistence of the samples is plotted, with the persistence of samples prepared in accordance with the method of this invention shown by the solid curve 40, and with the persistence of samples prepared by the same steps but omitting the addition of ammonium chloride between firing steps shown by the dashed curve 30.

Examination of FIG. 1 shows that without the ammonium chloride addition between firing steps, there is a gradual monotonic increase in phosphor brightness with increasing silica concentration in the phosphor (curve 10). However, as shown by FIG. 2, with these same phosphor samples, the increase in silica concentration produces a decline in phosphor persistence (curve 30).

On the contrary, as shown by curve 20 of FIG. 1, when ammonium chloride is added to the pre-fired phosphor blend between the first and second firing steps, there is a maximum brightness obtained for phosphors which have a composition corresponding to 1 mole of silica per formula unit of phosphor, that is, for phosphors corresponding to the stoichiometric formula $Zn_2SiO_4$.

The method of the present invention provides that the final phosphor will have a composition corresponding generally to stoichiometric zinc silicate by initially providing excess zinc oxide which is later removed in the second firing step by reaction with the ammonium chloride added between the firing steps. Evidence for the quantitative removal of excess zinc oxide by the ammonium chloride during the second firing step is indicated by the weight loss data appearing in Table II. The addition of 5 weight percent ammonium chloride to the pre-fired material between the first and second firing steps would result in the theoretical weight loss appearing in the righthand column of Table II if all of the chloride provided by $NH_4Cl$ combined with the ZnO to form $ZnCl_2$ which in turn is lost by volatilization. The data indicate that in every case the weight loss required by theory was realized.

TABLE II

| Sample | % Weight Loss (Measured) | % Weight Loss (Theoretical) |
| --- | --- | --- |
| 1 | 8.29 | 8.38 |
| 2 | 8.23 | 8.37 |
| 3 | 8.25 | 8.37 |
| 4 | 8.51 | 8.34 |
| 5 | 8.38 | 8.32 |
| 6 | 8.36 | 8.35 |
| 7 | 8.26 | 8.41 |

The method of the present invention thus provides a means of preparing substantially stoichiometric zinc silicate based phosphors having improved brightness and persistence, substantially free of inert zinc oxide and silica components.

While there have been shown and described what are believed at present to be the preferred embodiments of the present invention, it will be obvious to one skilled in the art that various changes and modifications may be made therein without departing from the scope of the invention as defined by the appended claims.

What is claimed is:

1. A method of preparing a green-emitting substantially stoichiometric manganese and arsenic coactivated zinc silicate phosphor characterized by improved brightness and persistence comprising the steps of:

(a) forming a blend of zinc oxide, silicic acid, an oxide of arsenic, and a manganese compound thermally convertible to manganese oxide, wherein the amount of silicic acid present in said blend is between about 0.9 to 1 times the molar amount stoichiometrically required to react with the zinc oxide present in said blend to form $Zn_2SiO_4$, (b) subjecting said blend to a first firing in air at a temperature of between about 650° C. and about 1000° C. for a period sufficient to form a pre-fired material including zinc silicate;

(c) adding to said pre-fired material an amount of ammonium chloride in excess of that required for complete reaction with any excess zinc oxide remaining in said pre-fired material subsequent to said first firing step, up to about 10 weight percent of said pre-fired mixture; and (d) subjecting said pre-fired mixture containing ammonium chloride to a second firing step at a temperature between about 1000° C. and about 1300° C. for a period sufficient to remove said excess zinc oxide from said pre-fired material and to form a phosphor comprising substantially stoichiometric zinc silicate, said phosphor exhibiting a higher brightness than the corresponding phosphor prepared by said method and fired at a temperature greater than 1000° C. in the first firing step.

2. A method in accordance with claim 1 further including the step of adding magnesium fluoride flux to said blend prior to said first firing step.

3. A method in accordance with claim 1 wherein said steps of first firing and second firing are carried out for a period of from about one to about four hours.

4. A method in accordance with claim 1 wherein said step of first firing is carried out at a temperature of between about 850° C. and about 1000° C.

5. A method in accordance with claim 1 wherein said step of second firing is carried out at a temperature of between about 1200° C. and about 1250° C.

* * * * *